United States Patent
Inoguchi et al.

[11] Patent Number: 6,151,062
[45] Date of Patent: Nov. 21, 2000

[54] STEREOSCOPIC IMAGE DISPLAY APPARATUS USING SPECIFIC MASK PATTERN

[75] Inventors: Kazutaka Inoguchi, Kawasaki; Hiroyasu Nose, Tokyo; Hideki Morishima, Kawasaki, all of Japan

[73] Assignee: Canon Kabushiki Kaisha, Tokyo, Japan

[21] Appl. No.: 09/025,087

[22] Filed: Feb. 17, 1998

[30] Foreign Application Priority Data

Feb. 18, 1997 [JP] Japan .................................. 9-051010

[51] Int. Cl.[7] .................................................. H04N 13/04
[52] U.S. Cl. ............................ 348/51; 348/42; 348/59; 345/419; 359/463
[58] Field of Search ........................... 348/42, 51, 53–54, 348/56–57, 59; 345/418–419, 420–421, 426; 359/462–463, 465–466, 475

[56] References Cited

U.S. PATENT DOCUMENTS

| | | | |
|---|---|---|---|
| 4,829,365 | 5/1989 | Eichenlaub | 348/54 |
| 5,083,199 | 1/1992 | Borner | 348/51 |
| 5,101,279 | 3/1992 | Kurematsu et al. | 349/95 |
| 5,392,140 | 2/1995 | Ezra et al. | 349/15 |
| 5,428,366 | 6/1995 | Eichenlaub | 345/102 |
| 5,465,175 | 11/1995 | Woodgate et al. | 359/463 |
| 5,537,144 | 7/1996 | Faris | 348/58 |
| 5,629,797 | 5/1997 | Ridgway | 359/464 |
| 5,663,831 | 9/1997 | Mashitani et al. | 359/463 |
| 5,833,507 | 11/1998 | Woodgate et al. | 445/24 |
| 5,875,055 | 2/1999 | Morishima et al. | 359/465 |
| 5,943,166 | 8/1999 | Hoshi et al. | 359/475 |

FOREIGN PATENT DOCUMENTS

| | | | |
|---|---|---|---|
| 0 788 008 A1 | 8/1997 | European Pat. Off. | H04N 13/00 |
| 0 827 350 A2 | 3/1998 | European Pat. Off. | H04N 13/04 |
| WO 94/06249 | 3/1994 | WIPO | H04N 13/04 |

OTHER PUBLICATIONS

U.S. application No. 08/794,891, filed Feb. 5, 1997.

*Primary Examiner*—Vu Le
*Attorney, Agent, or Firm*—Morgan & Finnegan LLP

[57] ABSTRACT

A stereoscopic image display apparatus for stereoscopically viewing an image displayed on a display, by transmitting light through a mask pattern where plural apertures and plural light shielding portions are arranged in a predetermined pitch in the horizontal and vertical directions, transmitting the luminous flux through an optical system for illuminating the display where at least two parallax images are displayed, and leading the luminous flux based on the two parallax images displayed on the display to the right eye and left eye of a viewer respectively. The apparatus enables to give flexibility to precise adjustment during the assembly and enables the viewing of a stereoscopic image from a wide area with good quality, by setting vertical widths Vt and Vs of the aperture and the light shielding portion of the mask pattern, and horizontal widths Ht and Hs of the aperture and the light shielding portion of the mask pattern to satisfy the relationship of Vt<Vs and Ht<Hs.

12 Claims, 8 Drawing Sheets

STEREOSCOPIC IMAGE DISPLAY APPARATUS USING SPECIFIC MASK PATTERN

BACKGROUND OF THE INVENTION

The present invention relates to a stereoscopic image display apparatus, particularly to be used preferably for stereoscopically displaying an image on a display device (display) e.g., TV, VCR, computer monitor, game machine and the like, and stereoscopically viewing the displayed image from a predetermined observation area.

As a conventional viewing method of a stereoscopic image, various methods have been suggested, for instance, a method of using polarizing glasses to show a viewer parallax images based upon mutually different polarizing states, or a method of using a lenticular lens to lead a predetermined parallax image of plural parallax images (viewpoint image) to a viewer's eye, and the like.

In the method of using a lenticular lens for stereoscopically displaying an image without wearing a special polarizing glasses, the lenticular lens is provided on the viewer's side of the display device so as to give directivity to each pixel of the parallax images displayed on the display device, thereby enabling the viewer to recognize a stereoscopic image.

The method of using the lenticular lens has an advantage of enabling stereoscopic viewing without using polarizing glasses. However, the method has a problem of glaring surface of the display because of the fact that a lenticular lens sheet is provided on the front surface of the display.

To cope with this problem, the inventor of the present invention has developed a stereoscopic image display apparatus disclosed in Japanese Patent Application No. 8-148611 enabling the viewing of a satisfactory stereoscopic image from a wide area.

The above application No. 8-148611 discloses a stereoscopic image display apparatus comprising: light source means for emitting light from plural apertures, having a light source and a mask substrate provided with a mask pattern having plural apertures; a micro-optical device having different optical effect in the horizontal and vertical directions; and a transmission-type display device. According to this stereoscopic image display apparatus, right stripe pixels and left stripe pixels, obtained by dividing each of a right-eye parallax image and a left-eye parallax image into multiple stripe patterns of pixels, are alternately arrayed in a predetermined order whereby forming one image as a stripe-combined image to be displayed on the display device; light emitted by the light source means is provided with a directivity by the micro-optical device so as to irradiate the stripe-combined image; and the light is separated into at least two areas, enabling the viewer to recognize the stripe-combined image as a stereoscopic image.

Note that the stereoscopic image display apparatus disclosed in Japanese Patent Application No. 8-148611 will be referred to as "the conventional stereoscopic image display apparatus" hereinafter.

In the conventional stereoscopic image display apparatus, the mask pattern is configured with apertures and light shielding portions arranged in a checked pattern. As a micro-optical device, two lenticular lenses each consisting of plural cylindrical lenses having refractive power in one direction are arranged such that the cylindrical lenses are arranged orthogonally.

Accordingly, an area from which an image on a display can be stereoscopically viewed is enlarged, making it possible to view an excellent stereoscopic image from a wide area.

Generally, in order to view an excellent stereoscopic image having high precision by the stereoscopic image display apparatus, it is important to have flexibility in precise adjustment during the assembly of each of the components constructing the entire apparatus.

SUMMARY OF THE INVENTION

The present invention has been made in consideration of the above situation, and has as its object to further improve the conventional stereoscopic image display apparatus, and provide a stereoscopic image display apparatus which enables the viewing of a high quality stereoscopic image from a wide area without seeing a double image, while giving flexibility to precise adjustment during the assembly of the main portion of the components which construct the entire apparatus.

In order to attain the above object, the present invention has the following configuration.

More specifically, a stereoscopic image display apparatus comprises: light providing means for providing patterned luminous flux including plural light existing areas and plural light non-existing areas each of which are arranged both in the horizontal and vertical directions; optical means having an array of optical elements each having a lens function at least in the vertical direction; a display device for displaying two parallax images for respective one of right and left eyes of a viewer by being illuminated with the patterned luminous flux via the optical means, for leading the luminous flux from the parallax image for the right eye to the right eye and for leading the luminous flux from the parallax image for the left eye to the left eye, thereby enabling stereoscopic viewing of a image. This stereoscopic image display apparatus is characterized in that, assuming vertical widths of the light existing areas and light non-existing areas are Vt and Vs respectively, the vertical widths are set so as to satisfy the relation of Vt<Vs.

Since the stereoscopic image display apparatus according to the present invention gives flexibility to required precise alignment in vertical positioning as compared to the conventional stereoscopic display apparatus, it is possible to achieve cost reduction in adjustment during assembly. By setting each component to satisfy the above relationship, the present invention enables the viewing of a high quality stereoscopic image from a wide area without seeing a double image, while giving flexibility to precise adjustment during the assembly of the main portion of components which construct the entire apparatus.

Moreover, a stereoscopic image display apparatus comprises: light providing means for providing patterned luminous flux including plural light existing areas and plural light non-existing areas each of which are arranged both in the horizontal and vertical directions; optical means having an array of optical elements each having a lens function at least in the vertical direction and having an array of optical elements each having a lens function at least in the horizontal direction; a display device for displaying two parallax images for respective one of right and left eyes of a viewer by being illuminated with the patterned luminous flux via the optical means, for leading the luminous flux from the parallax image for the right eye to the right eye and for leading the luminous flux from the parallax image for the left eye to the left eye, thereby enabling stereoscopic viewing of a image. This stereoscopic image display apparatus is characterized in that, assuming horizontal widths of the light existing areas and light non-existing areas are Ht and Hs respectively, the vertical widths are set so as to satisfy the relation of Ht<Hs.

Since the stereoscopic image display apparatus according to the present invention gives flexibility to required precise alignment in horizontal positioning as compared to the conventional stereoscopic display apparatus, it is possible to achieve cost reduction in adjustment during assembly. By setting each component to satisfy the above relationship, the present invention enables the viewing of a high quality stereoscopic image from a wide area without seeing a double image, while giving flexibility to precise adjustment during the assembly of the main portion of components which construct the entire apparatus.

Moreover, a stereoscopic image display apparatus comprises: a light source; a mask substrate provided with a mask pattern having plural light transmitting portions and plural light shielding portions each of which are arranged both in the horizontal and vertical directions for providing patterned luminous flux; an optical device having an array of optical elements each having a lens function at least in the vertical direction; a display device for displaying two parallax images for respective one of right and left eyes of a viewer by being illuminated with the patterned luminous flux via the optical device, for leading the luminous flux from the parallax image for the right eye to the right eye and for leading the luminous flux from the parallax image for the left eye to the left eye, thereby enabling stereoscopic viewing of a image. This stereoscopic image display apparatus is characterized in that, assuming vertical widths of the light transmitting portions and light shielding portions are Vt and Vs respectively, the vertical widths are set so as to satisfy the relation of Vt<Vs.

Since the stereoscopic image display apparatus according to the present invention gives flexibility to required precise alignment in vertical positioning as compared to the conventional stereoscopic display apparatus, it is possible to achieve cost reduction in adjustment during assembly. By setting each component to satisfy the above relationship, the present invention enables the viewing of a high quality stereoscopic image from a wide area without seeing a double image, while giving flexibility to precise adjustment during the assembly of the main portion of components which construct the entire apparatus.

Furthermore, a stereoscopic image display apparatus comprises: a light source device having plural light emitting portions and plural light non-emitting portions each of which are arranged both in the horizontal and vertical directions for providing patterned luminous flux; an optical device having an array of optical elements each having a lens function at least in the vertical direction; a display device for displaying two parallax images for respective one of right and left eyes of a viewer by being illuminated with the patterned luminous flux via the optical device, for leading the luminous flux from the parallax image for the right eye to the right eye and for leading the luminous flux from the parallax image for the left eye to the left eye, thereby enabling stereoscopic viewing of a image. This stereoscopic image display apparatus is characterized in that, assuming vertical widths of the light emitting portions and light non-emitting portions are Vt and Vs respectively, the vertical widths are set so as to satisfy the relation of Vt<Vs.

Since the stereoscopic image display apparatus according to the present invention gives flexibility to required precise alignment in horizontal positioning as compared to the conventional stereoscopic display apparatus, it is possible to achieve cost reduction in adjustment during assembly. By setting each component to satisfy the above relationship, the present invention enables the viewing of a high quality stereoscopic image from a wide area without seeing a double image, while giving flexibility to precise adjustment during the assembly of the main portion of components which construct the entire apparatus.

According to a preferred embodiment of the present invention, the light providing means forms the plural light existing areas and the plural light non-existing areas by means of a mask substrate provided with a mask pattern having plural light transmitting portions for transmitting illumination light and plural light shielding portions for blocking the illumination light each of which are arranged in a predetermined pitch in the horizontal direction and arranged in a predetermined pitch in the vertical direction, and the Vt and Vs are vertical widths of the light transmitting portions and light shielding portions, respectively.

According to a preferred embodiment of the present invention, the light providing means forms the plural light existing portions and the plural light non-existing portions by means of a light source device in which plural light emitting portions and plural light non-emitting portions are arranged in a predetermined pitch in the horizontal direction and arranged in a predetermined pitch in the vertical direction, and the Vt and Vs are vertical widths of the light emitting portions and light non-emitting portions, respectively.

According to a preferred embodiment of the present invention, assuming horizontal widths of the light existing areas and light non-existing areas are Ht and Hs respectively, the vertical widths are set so as to satisfy the relation of Ht<Hs.

According to a preferred embodiment of the present invention, the optical means comprising a fist lenticular lens where a plurality of cylindrical lenses having refractive power in the horizontal direction are arrayed horizontally in a predetermined pitch, and a second lenticular lens where a plurality of cylindrical lenses having refractive power in the vertical direction are arrayed vertically in a predetermined pitch.

According to a preferred embodiment of the present invention, the image displayed by the display device consists of a horizontal-stripe combined image, in which two parallax images are respectively divided into multiple horizontal-stripe parallax images, and the divided horizontal-stripe parallax images are repeatedly arrayed in a predetermined pitch in the vertical direction in a predetermined order in correspondence with the N number of parallax images.

According to a preferred embodiment of the present invention, the optical means converts each part of the patterned luminous flux into substantially parallel luminous flux in the horizontal cross section, and into luminous flux converging substantially on the display device in the vertical cross section.

According to a preferred embodiment of the present invention, the light providing means forms the plural light existing areas and the plural light non-existing areas by means of a mask substrate provided with a mask pattern having plural light transmitting portions for transmitting illumination light and plural light shielding portions for blocking the illumination light each of which are arranged in a predetermined pitch in the horizontal direction and arranged in a predetermined pitch in the vertical direction, and the Ht and Hs are horizontal widths of the light transmitting portions and light shielding portions, respectively.

According to a preferred embodiment of the present invention, the optical means includes a fist lenticular lens where a plurality of cylindrical lenses having refractive power in the horizontal direction are arrayed horizontally in a predetermined pitch, and a second lenticular lens where a plurality of cylindrical lenses having refractive power in the vertical direction are arrayed vertically in a predetermined pitch.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
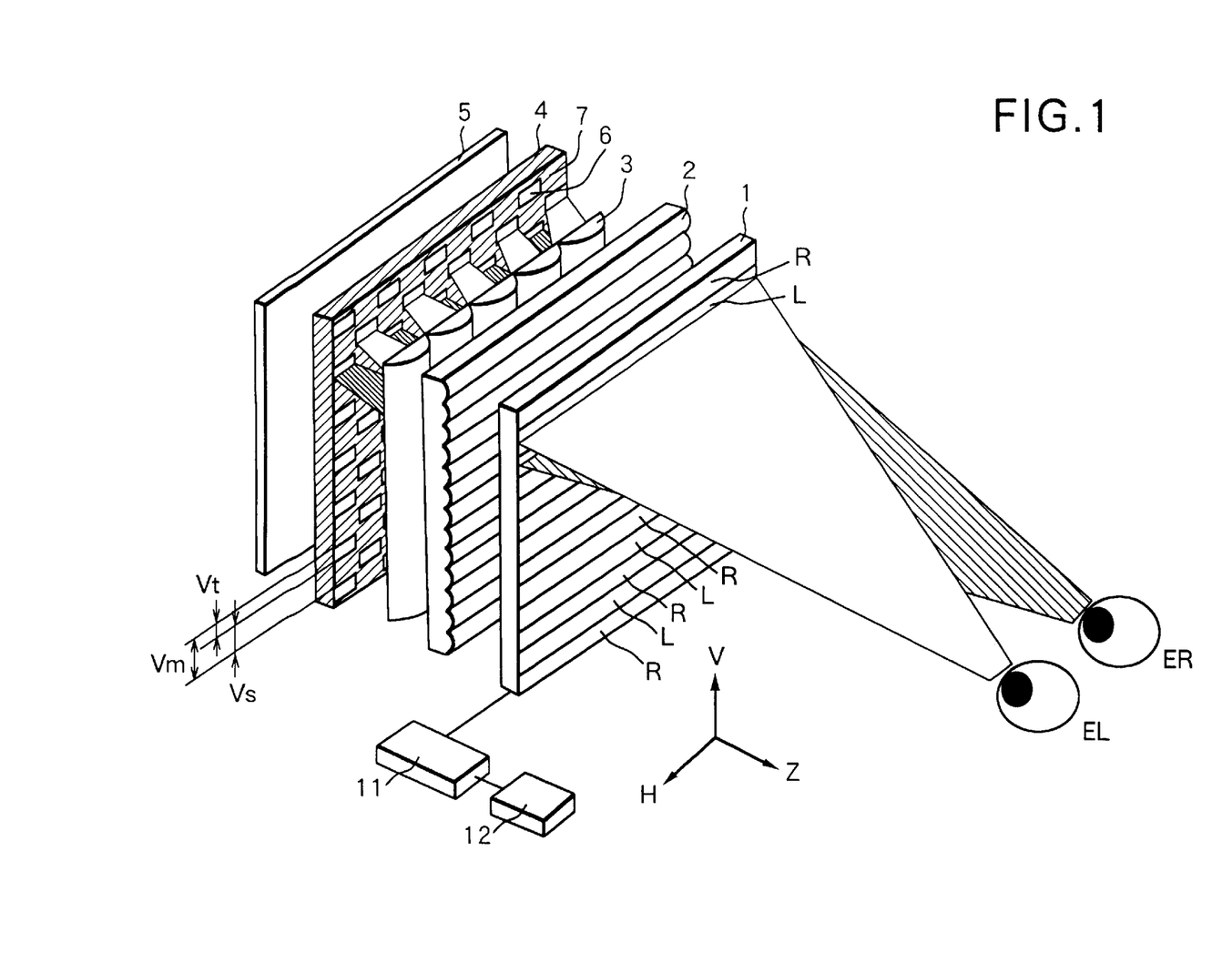
FIG. 1 is a perspective view showing the main portion of the first embodiment of the present invention.
Figure 2:
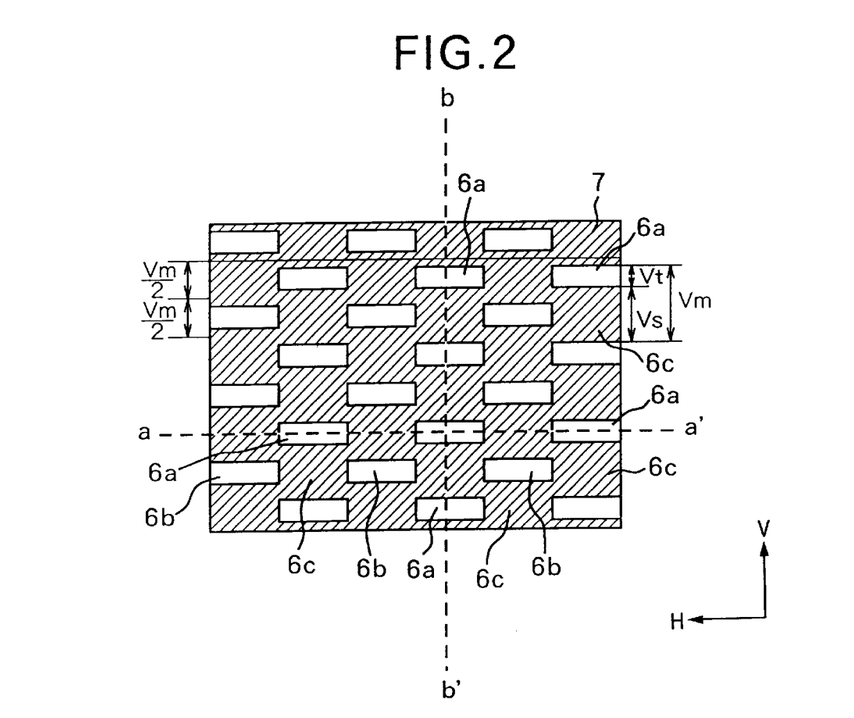
FIG. 2 is an explanatory view of a mask pattern shown in FIG. 1.
Figure 3:
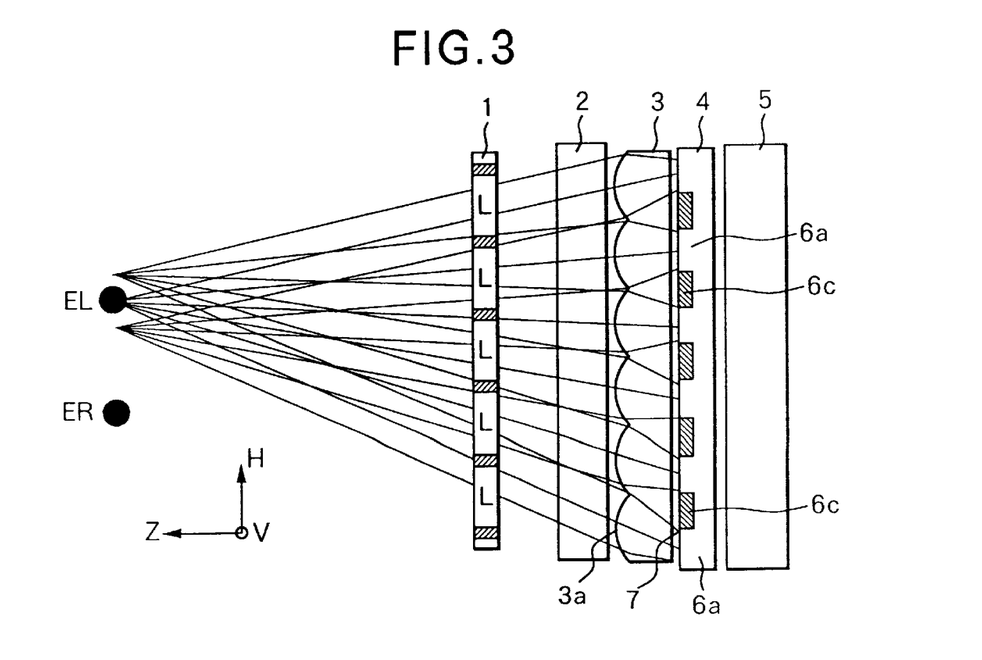
FIG. 3 is an explanatory view of an H-Z plane of the H-V-Z coordinates system shown in FIG. 1.
Figure 4:
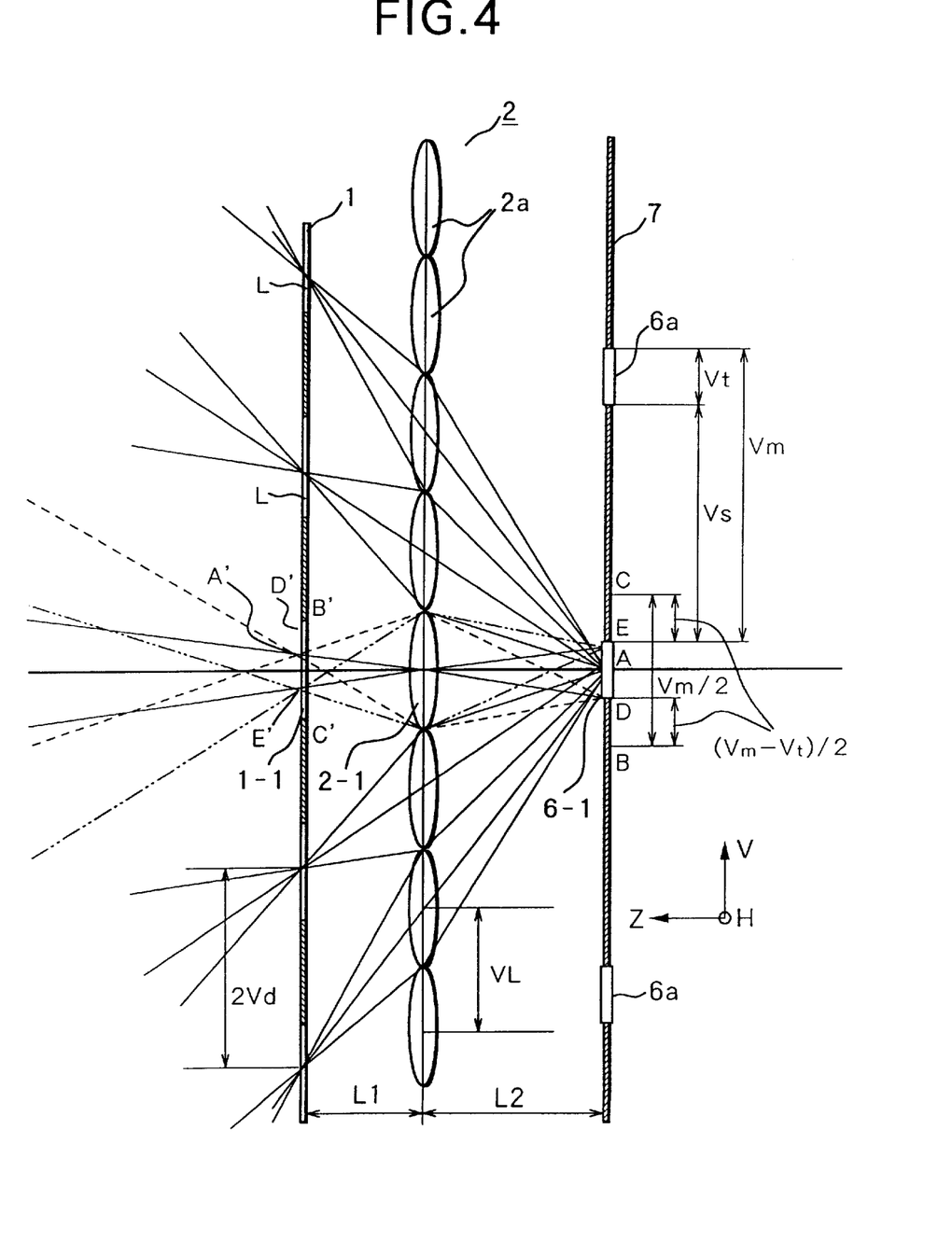
FIG. 4 is an explanatory view of a V-Z plane of the H-V-Z coordinates system in FIG. 1.

FIG. 1 is a perspective view showing the main portion of the first embodiment of the present invention. FIG. 2 is an explanatory view of a mask pattern shown in FIG. 1. FIG. 3 is an explanatory view of a H-V-Z coordinates system shown in FIG. 1; and FIG. 4 is an explanatory view of a V-Z plane of the H-V-Z coordinates system in FIG. 1.

Referring to FIG. 1, reference numeral 1 denotes a transmission-type liquid crystal display (LCD) for displaying an image, for example, having a liquid crystal layer, glass substrates, polarizing plate, color filters, black matrix, electrodes and the like. Reference numeral 5 denotes a back light serving as a light source. Located in front of the back light 5 is a mask substrate 4 on which a mask pattern 7, having light-transmitting apertures (opening) 6 arranged in a checked pattern in a predetermined pitch, is formed. The mask pattern 7 is made of a metal deposition film such as chrome or the like, or light absorptive materials, and is formed on the mask substrate 4 made of a glass or resin by patterning.

As shown in FIG. 2, an aperture width $V_t$ of each of apertures 6a and 6b in the vertical direction (direction V) of the mask pattern and a light shielding width $V_s$ of each of light shielding portions 6c in the vertical direction of the mask pattern satisfy the relation of $V_t<V_s$. The aperture width $H_t$ and light shielding width $H_s$ in the horizontal direction satisfy the relationship of $H_t=H_s$.

In FIG. 1, reference numeral 3 denotes a first lenticular lens (vertical lenticular lens) where a plurality of cylindrical lenses, having horizontal (direction H) refractive power, are arranged in the horizontal direction; and 2, a second lenticular lens (horizontal lenticular lens) where a plurality of cylindrical lenses, having vertical (direction V) refractive power, are arranged in the vertical direction.

The first and second lenticular lenses 3 and 2 are positioned in an arbitrary order in between the mask substrate 4 and the liquid crystal display 1 which displays an image.

On the LCD 1 which displays an image, two parallax images R and L (ER and EL in FIG. 1) are alternately displayed in the horizontal-stripe pattern. Reference numeral 11 denotes a display driver for displaying a horizontal-stripe combined image on the LCD 1. Reference numeral 12 denotes an image processor, wherein multiple horizontal-stripe parallax images (parallax image) are taken out of plural parallax images of a stereoscopic object viewed from plural viewpoints, and combined by repeatedly arraying them in a predetermined order in a predetermined pitch in the vertical direction, whereby generating a horizontal-stripe combined image. The generated horizontal-stripe combined image is inputted to the display driver 11.

Light from the back light 5 transmits through each of the apertures 6 of the mask pattern 7, illuminates the LCD 1 through the first and second lenticular lenses 3 and 2, and separates plural parallax images displayed on the LCD 1 at a predetermined observation position. By this, a stereoscopic image displayed on the LCD 1 can be viewed.

FIG. 3 is a cross-sectional top view of the stereoscopic image display apparatus shown in FIG. 1, and explains the principle of how each of the parallax images corresponding to two viewpoints is separated in the horizontal direction and viewed from the observation position in front of the LCD 1 shown in FIG. 1. FIG. 3 shows a cross-section of a line pattern having apertures 6a of the mask pattern 7 in which illuminated light based on the left parallax image L as the first viewpoint is focused on a left eye EL (corresponding to a cross section cut along the line a–a' in FIG. 2).

In FIG. 3, luminous flux from the back light 5 illuminates the mask substrate 4, and the light emits through the apertures 6a of the mask pattern 7. The first lenticular lens 3 is positioned between the mask substrate 4 and the LCD 1 (since the second lenticular lens 2 does not have a horizontal refractive power, it is shown as a flat board in FIG. 3). A lens curvature of the plurality of cylindrical lenses 3a is designed such that the mask pattern 7 is positioned at a substantial focus point of each of the cylindrical lenses 3a. It is designed such that a pair of aperture 6a and light shielding portion 6c of the mask pattern 7 is slightly larger than one pitch of the cylindrical lens 3a of the first lenticular lens 3. Illuminated luminous flux from one point of a row (horizontal direction) of aperture arrays (line pattern), consisting of the apertures 6a and light shielding portions 6c on the mask substrate 4 shown in FIG. 3, is changed to a substantial-parallel luminous flux having a certain directivity by the first lenticular lens 3; the substantial-parallel luminous flux illuminates the first parallax image L (left parallax image) of the two horizontal-stripe parallax images arrayed cyclically in the vertical direction which are displayed on the LCD 1; and the substantial-parallel luminous flux focuses on around the first viewpoint (left eye) EL.

Similarly, a row of aperture arrays consisting of the apertures 6b and light shielding portions 6c on the mask substrate 4 is an aperture array positioned one row below (direction V) the aforementioned row of aperture arrays in FIG. 2, and is configured with a pattern where a column of the apertures 6a and a column of light shielding portions 6c are horizontally shifted by ½ pitch, a pitch being the distance between an aperture (e.g. 6a) and a light shielding portion (e.g. 6c). The luminous flux illuminated through the apertures 6b is changed similarly to substantial-parallel luminous flux having a certain directivity, which is different from the aforementioned directivity shown in FIG. 3, by the first lenticular lens 3; the substantial-parallel luminous flux illuminates the second parallax image R (right parallax image) of the two horizontal-stripe parallax images arrayed cyclically in the vertical direction which are displayed on the LCD 1; and the substantial-parallel luminous flux focuses on around the second viewpoint (right eye) ER.

In other words, the luminous flux emitted through the apertures 6 on the mask substrate 4 is changed to substantial-parallel luminous flux by transmitting through the first lenticular lens 3, illuminates each of the first and second parallax images R and L on the LCD 1 with respective directivities, and focuses on viewpoints EL and ER. Accordingly, image data displayed on the LCD 1 is stereoscopically viewed.

FIG. 4 is a schematic view (cross section cut along the line b–b' in FIG. 2) of a V-Z cross section (direction V) of the stereoscopic image display apparatus according to the present invention. Next, description will be given of an observation area in terms of the vertical direction, with reference to FIG. 4.

The first lenticular lens 3 which does not have a refractive power on the cross section, and glass substrates which do not directly relate to the optical effect are omitted in FIG. 4. Also, the second lenticular lens 2 is conceptually shown. The apertures 6a of the mask pattern 7 on the mask substrate 4 are arranged as shown in FIG. 2. In terms of the vertical direction, each row is shifted alternately by ½ pitch in the horizontal direction in correspondence with the two horizontal-stripe parallax images L and R arrayed cyclically in the vertical direction which are displayed on the LCD 1.

The line pattern on the mask pattern 7 shown in FIG. 4 is used for illuminating parallax image lines of any one of the two parallax images L and R. FIG. 4 shows, as an example, a line pattern of the left parallax image L (first parallax image) corresponding to the first viewpoint. The black portions on the mask pattern 7 besides the apertures 6a are light shielding portions 6c where light does not transmit through. A line on the LCD 1 displaying the stripe-patterned left parallax image L corresponding to the first viewpoint is shown in white, and a line displaying the stripe-patterned right parallax image R corresponding to the second viewpoint is shown in black.

Herein, it is defined that a vertical pitch between an aperture 6a and an adjacent aperture 6a on the mask pattern 7 is Vm; a pitch of cylindrical lenses 2a of the second lenticular lens 2 is VL; a focal distance, in the direction of the sheet of FIG. 4 (V-Z plane), of each of the cylindrical lenses constructing the second lenticular lens 2 is fv (not shown); a pixel pitch in the vertical direction (direction V) of the LCD 1 which displays an image is Vd; the distance from the display surface of the LCD 1 to the second lenticular lens 2 is L1; and the distance from the second lenticular lens 2 to the mask pattern 7 is L2. Each value is set so as to satisfy the followings:

$$0.95 < \{Vd/(Vm/2)\}/(L1/L2) < 1.05 \quad (1)$$

$$0.96 < (Vd/VL)/\{(L1+L2)/(2 \cdot L2)\} < 1.04 \quad (2)$$

$$0.9 < (1/fv)/(1/L1+1/L2) < 1.1 \quad (3)$$

When the above relations are satisfied, luminous flux from one point of an aperture 6a of the mask pattern 7 is focused on the corresponding pixel lines L, as indicated by the broken lines shown in FIG. 4. Paying attention to one aperture 6-1 of the apertures 6a of the line pattern corresponding to the first viewpoint of the mask pattern 7, the luminous flux emitted from the center point A of the aperture 6-1 shown in the center of FIG. 4 is incident upon the corresponding cylindrical lens 2-1 of the second lenticular lens 2 and focused on the center of the pixel line 1-1 in the LCD 1 as indicated by the broken line shown on the point A'. Luminous flux which is emitted from the center point A of the aperture 6-1 and incident upon cylindrical lenses other than the cylindrical lens 2-1 which construct the lenticular lens 2, is focused on each center of other pixel lines representing the first parallax image L on the LCD 1.

Luminous flux emitted from points D and E which are the edges of the aperture 6-1 and incident upon the corresponding cylindrical lens 2-1 of the second lenticular lens is focused respectively on points D' (broken line) and E' (two-dot chain line) at the end of the pixel line 1-1. Similarly, luminous flux which is emitted from other points of the aperture 6-1 and incident upon cylindrical lens 2-1 is focused on the pixel line 1-1 on the LCD 1 as a focal line. All luminous flux emitted from the aperture 6-1 and incident upon cylindrical lenses other than the cylindrical lens 2-1 is focused on the pixel lines displaying the first parallax image L on the LCD 1.

Luminous flux emitted through the apertures having a checked pattern besides the aperture 6-1 is all similarly focused on the pixel lines displaying the first parallax image L on the LCD 1, and illuminates lines of the first parallax image L on the LCD 1. Then, the luminous flux transmitted through the LCD 1 is diverged only in the vertical direction in correspondence with the NA (numerical aperture) of each luminous flux at the time of focusing, enabling to obtain an observation area in which the first parallax image is viewed as equally separated images from the top to bottom of the display, from a predetermined height of a viewer's eye.

Although the above description has been given with respect to the fist parallax image L at the observation position, the similar description applies to the second parallax image R (right parallax image) based on the second viewpoint.

In other words, the tolerance of assembling error is increased by the distance between points D' and B' on the pixel line 1-1 (in a case where the black matrix or the like of the liquid crystal is disregarded). In practice, the aperture ratio of a pixel of the LCD is not 100% due to the black matrix which shields light, but is set so as not to incident light to the adjacent (vertical) pixel aperture.

Supposing that the mask pattern 7 and the second lenticular lens 2 are perfectly adjusted and positioned, tolerance of positioning the LCD 1 and the illumination system from the back light 5 to the second lenticular lens with relation to the vertical direction on the H-V plane is expressed in the following expression (4):

$$Vd \cdot \{(2-\alpha)-Vt/(Vm/2)\}/2 \qquad (4)$$

Herein, $\alpha$ is a ratio (vertical pixel aperture ratio) of a vertical pixel aperture width to the vertical pitch Vd of an LCD pixel.

Compared to the conventional stereoscopic image display apparatus, the tolerance of positioning error is increased by the amount given by the expression (5).

$$Vd \cdot \{1-Vt/(Vm/2)\}/2 \qquad (5)$$

Figure 5A:
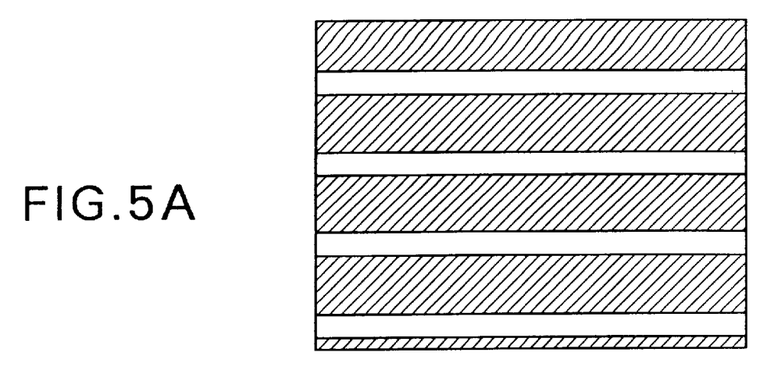
FIG. 5A is a drawing showing an illumination pattern of light arrived on the display surface of an image on an LCD.
Figure 5B:
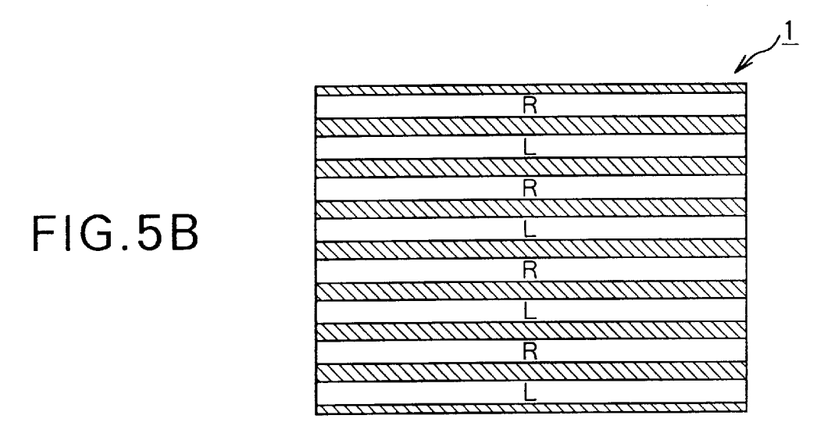
FIG. 5B is an explanatory view schematically showing the pixel lines R and L of the LCD in the configuration of FIG. 1.
Figure 5C:
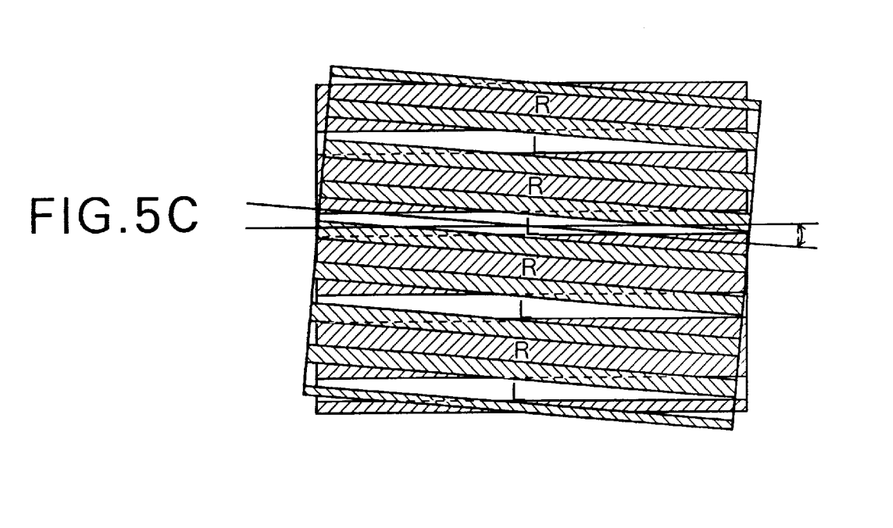
FIG. 5C is an explanatory view showing a deviation in the rotational direction, generated between an illumination pattern shown in FIG. 5A and pixel lines R and L shown in FIG. 5B.

FIGS. 5A to 5C are explanatory views for explaining the tolerance of deviation in the rotational direction supposing the center of the stereoscopic image display apparatus as the center of rotation. FIG. 5A shows an illumination pattern of light which is emitted through the apertures 6a (the aperture through which luminous flux for left eye transmits) of the mask pattern 7, transmitted through the lenticular lenses 3 and 2, and reaches the liquid crystal layer (image display surface) on the LCD 1.

FIG. 5B is an explanatory view schematically showing the pixel lines R and L (parallax images R and L) on the LCD 1. FIG. 5C is an explanatory view showing a deviation in the rotational direction, generated between the illumination pattern shown in FIG. 5A and pixel lines R and L in FIG. 5B.

Light emitted through apertures is alternately thinned out by a line of the mask pattern 7 shown in FIG. 2 (herein, the apertures for right eye are thinned out, and description will be given on apertures for left eye), is given a directivity toward the left eye of a viewer by the first lenticular lens 3. The light is focused on the corresponding pixel lines L by the second lenticular lens 2 as described above, thereby forming an illumination pattern on the image display surface of the LCD 1 as shown in FIG. 5A.

On the image display surface of the LCD 1, the pixel lines R and L, in which horizontal-long left and right parallax images are alternately arrayed in the vertical direction as shown in FIG. 5B, are arranged while including light shielding portions, i.e. black matrices, in between the horizontal pixels. Note that the black matrices in between the horizontal pixels are omitted herein since they are not necessary for the description.

If a large deviation is generated in the rotational direction as shown in FIG. 5C, a part of the illuminated light shown in FIG. 5A is lead to the left eye of the viewer through the pixel lines R on the image display surface of the LCD 1, causing a crosstalk.

The condition of positioning for not generating the crosstalk is in that the rotation angle satisfies the following expression (6):

$$\arcsin[Vd \cdot \{(2-\alpha)-Vt/(Vm/2)\}/W] \qquad (6)$$

(where W is a width of a display in the horizontal direction).

The tolerance of positioning error of the conventional stereoscopic image display apparatus is given by the expression (7):

$$\arcsin\{Vd \cdot (1-\alpha)/W\} \qquad (7)$$

Accordingly, the tolerance is increased as compared to the conventional stereoscopic image display apparatus.

Assuming a case where the ratio of the aperture width Vt in the vertical direction in the present embodiment to the aperture width Vm/2 in the vertical direction in the conventional stereoscopic image display apparatus is set to $Vt/(Vm/2)=\beta=0.8$, the absolute value of the tolerance of positioning error in the vertical direction is increased by 0.033 mm according to equations (5), (6) and (7), and the absolute value of the tolerance of deviation in the rotational direction is increased by 0.018°

In this case, the tolerance is doubled.

As has been described above, according to the above described configuration of the present embodiment, since required precise alignment in positioning is less strict as compared to the conventional stereoscopic display apparatus, it is possible to achieve cost reduction in adjustment during assembly. Furthermore, according to the present embodiment, by specifying each component as described above, it is possible to achieve a stereoscopic image display apparatus which enables the viewing of a high quality stereoscopic image from a wide area without seeing a double image, while giving flexibility to precise adjustment during the assembly of the main portion of components which construct the entire apparatus.

<Second Embodiment>

Figure 6:
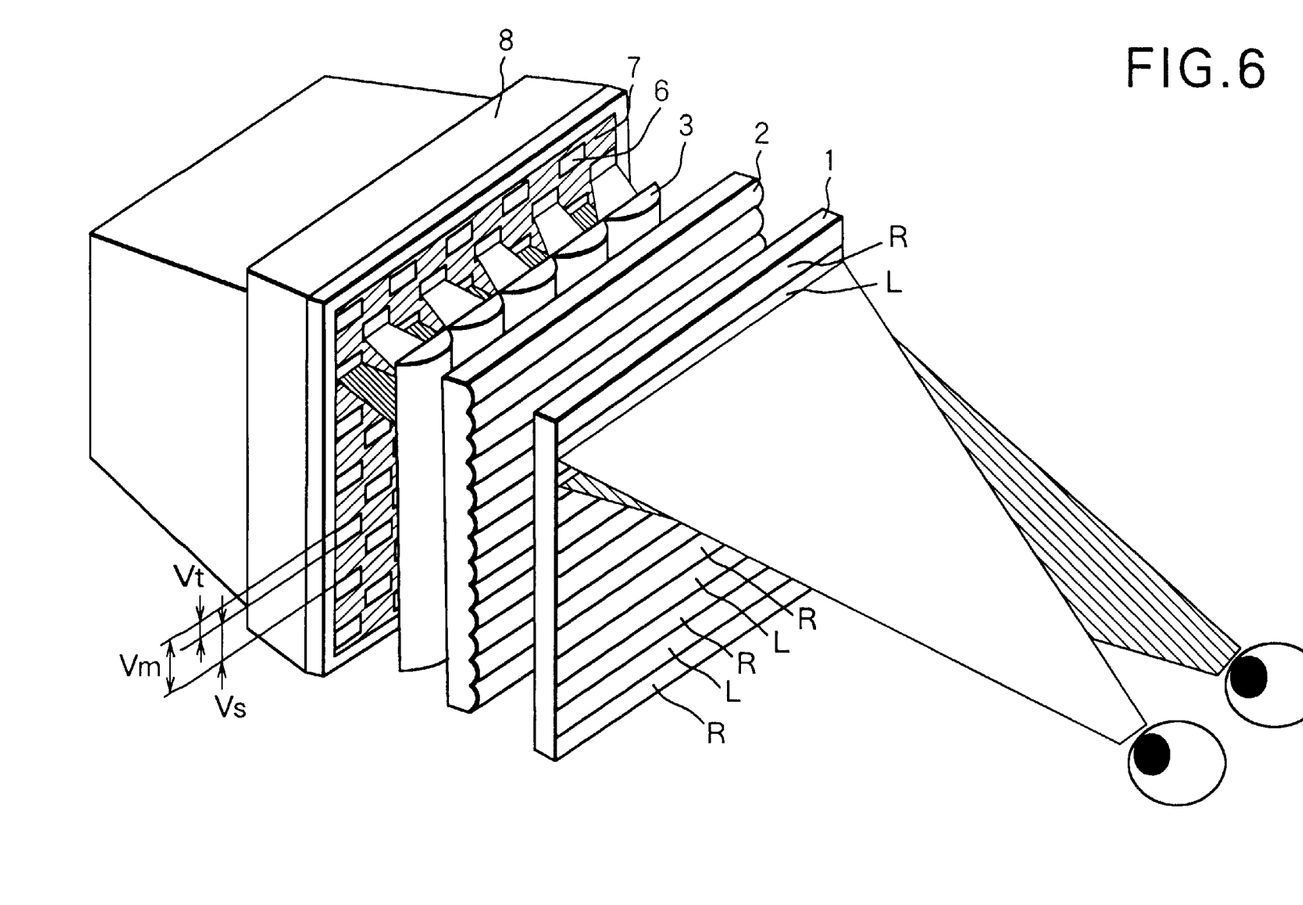
FIG. 6 is a perspective view showing the main portion of the second embodiment according to the present invention.

FIG. 6 is a perspective view showing the main portion of the second embodiment according to the present invention. The second embodiment differs from the first embodiment by utilizing a CRT 8 which is a self-illuminating device in place of the mask substrate 4 and back light 5, to form a pattern consisting of emission portions and non-emission portions. Other constructions are the same as that of the first embodiment. Assuming that the horizontal widths of the emission portions and non-emission portions are Ht and Hs respectively and the vertical widths of the emission portions and non-emission portions are Vt and Vs respectively, the relationship of Ht=Hs and Vt<Vs are satisfied as similar to the first embodiment. The second embodiment also utilizes luminous flux from the emission portion as similar to the first embodiment, attaining the same effect. More specifically, according to the configuration of the second embodiment, since required precise alignment in positioning is less strict as compared to the conventional stereoscopic display apparatus, it is possible to achieve cost reduction in adjustment during assembly. It is possible to achieve a stereoscopic image display apparatus which enables the viewing of a high quality stereoscopic image from a wide area without seeing a double image, while giving flexibility to precise adjustment during the assembly of the main portion of components which construct the entire apparatus.

<Third Embodiment>

Figure 7:
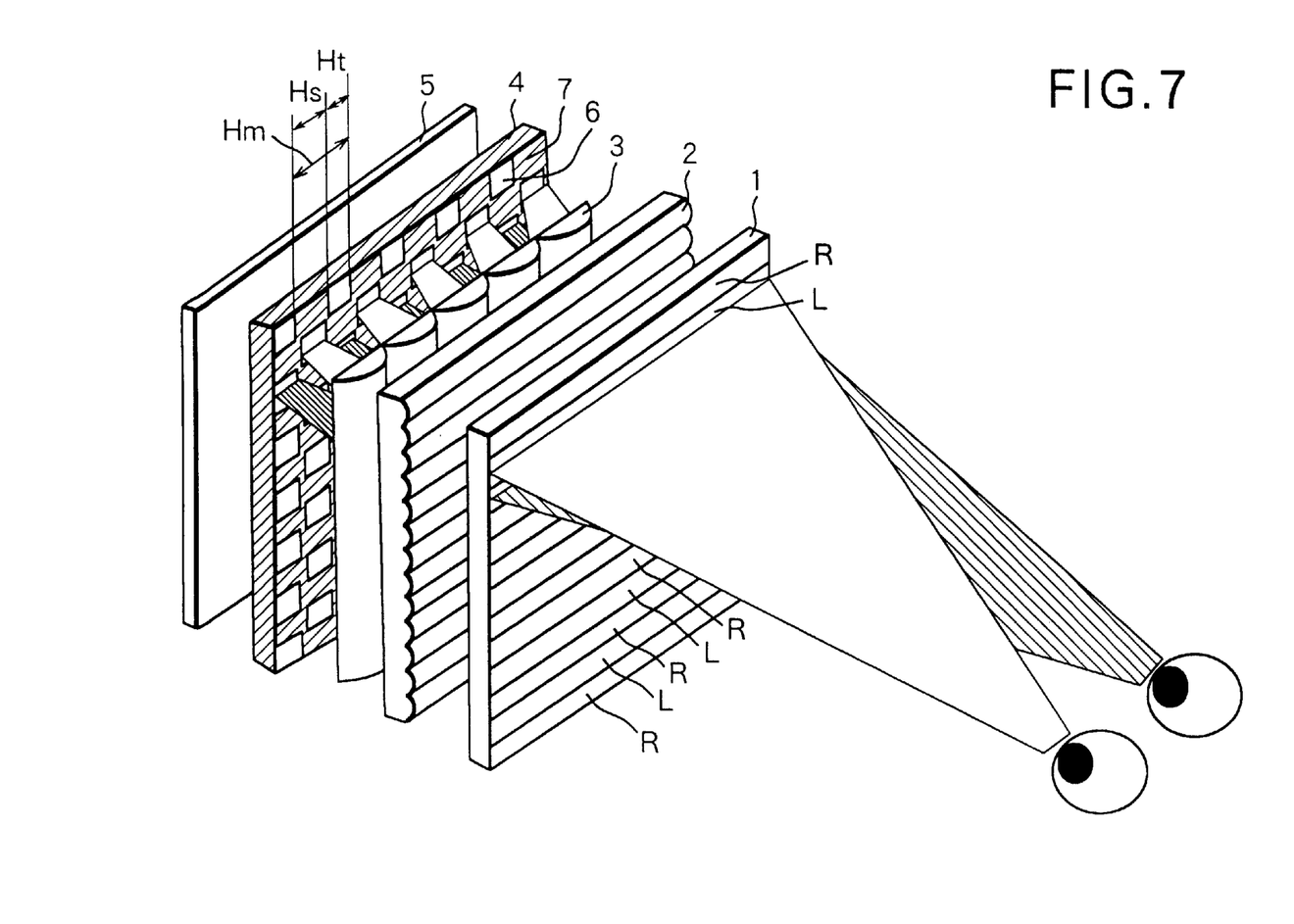
FIG. 7 is a perspective view showing the main portion of the third embodiment according to the present invention.

FIG. 7 is a perspective view showing the main portion of the third embodiment according to the present invention. The third embodiment differs from the first embodiment in the vertical- and horizontal-width relation between the apertures and the light shielding portions of the mask pattern. Herein, the horizontal widths Ht and Hs of the aperture and light shielding portion are set so as to satisfy Ht<Hs, and the vertical widths Vt and Vs of the aperture and light shielding portion are set so as to satisfy Vt=Vs. Other constructions are the same as that of the first embodiment.

In FIG. 7, the same reference numerals are assigned to the components shown in FIG. 1.

Figure 8:
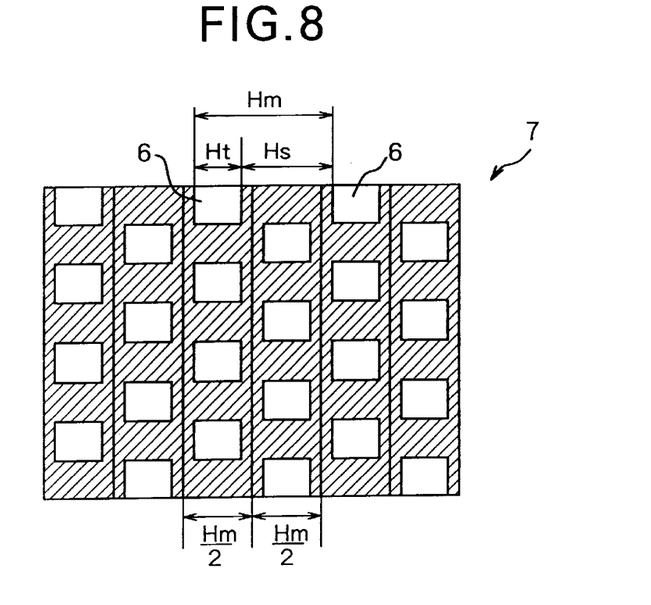
FIG. 8 is an explanatory view of a mask pattern shown in FIG. 7.

In the third embodiment, the relationship between the pitch Hm (=Hs+Ht) of the aperture 6 and light shielding portion of the mask pattern 7, and other dimensions are the same as the first embodiment. FIG. 8 is a front view of the mask pattern 7 according to the third embodiment.

If a graph is drawn, taking a horizontal position on a viewing surface as the abscissa and the light intensity thereupon as the ordinate, the light intensity from the respective pixel lines R and L form rectangular waves on the viewing surface. If the rise of the rectangular wave is slightly slow, light from the pixel lines R and L intersect. And if a viewer's eye is near the intersection portion, the viewer might recognize the image as a double image where the left and right images are mixed.

To cope with the above situation, the horizontal width of each aperture of the mask pattern 7 is narrowed so that a distributed width of the light amount on the observation surface of the light transmitted through the respective apertures is narrowed.

Figure 9:
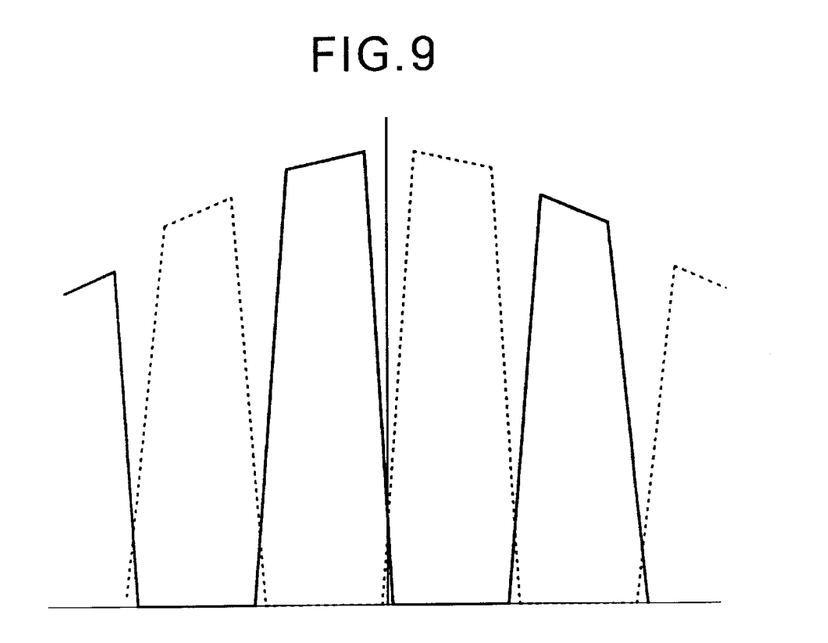
FIG. 9 is an explanatory view showing distribution of a light amount on the horizontal cross-section of an observation surface.

FIG. 9 shows distribution of a light amount on the observation surface of the light from the pixel lines R and L according to the stereoscopic image display apparatus of the present embodiment. In the graph shown in FIG. 9, the abscissa corresponds to a position on the viewing surface in the horizontal direction, and the ordinate indicates the amount of light thereon. As shown in FIG. 9, by limiting the aperture width Ht of the aperture 6, the light distribution of each of the pixel lines R and L intersects at the point near the light amount 0. By this configuration, a portion viewed as a double image by a viewer in the conventional apparatus is recognized as a dark portion of an image, enabling easy image recognition.

Figure 10:
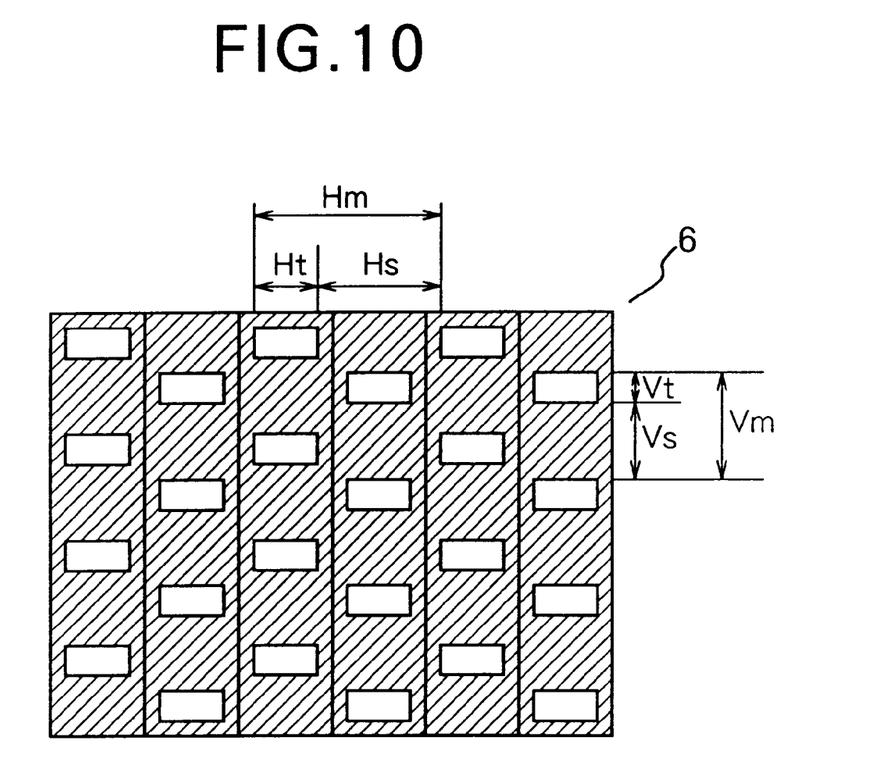
FIG. 10 is an explanatory view of a mask pattern according to another embodiment of the present invention.

Note that the mask pattern in the present embodiment may be configured with a reduced aperture ratio in the horizontal and vertical directions in the mask pattern 7 as shown in FIG. 10, i.e. configured such to satisfy Ht<Hs and Vt<Vs, so as to attain the advantage of the first and third embodiments.

As similar to the second embodiment, the mask substrate 4 and back light 5 may be substituted with the CRT 8 serving as the self-illuminating device. In this case Ht<Hs is satisfied, assuming that the horizontal widths of the emission portions and non-emission portions are Ht and Hs respectively. Naturally, the vertical widths of the emission portions Vt and non-emission portions Vs may be set to VT<Vs.

The present invention is not limited to the above embodiments and various changes and modifications can be made within the spirit and scope of the present invention. Therefore, to appraise the public of the scope of the present invention, the following claims are made.

What is claimed is:

1. A stereoscopic image display apparatus comprising;
    light providing means for providing patterned luminous flux including plural light existing areas and plural light non-existing areas each of which are arranged both in the horizontal and vertical directions;
    optical means having an array of optical elements each having a lens function at least in the vertical direction;
    a display device for displaying two parallax images for respective one of right and left eyes of a viewer by being illuminated with the patterned luminous flux via said optical means, for leading the luminous flux from the parallax image for the right eye to the right eye and for leading the luminous flux from the parallax image for the left eye to the left eye, thereby enabling stereoscopic viewing of a image;
    wherein assuming vertical widths of the light existing areas and light non-existing areas are Vt and Vs respectively, the vertical widths are set so as to satisfy the relation of Vt<Vs.

2. The stereoscopic image displaying apparatus according to claim 1, wherein said light providing means forms the plural light existing areas and the plural light non-existing areas by means of a mask substrate provided with a mask pattern having plural light transmitting portions for transmitting illumination light and plural light shielding portions for blocking the illumination light each of which are arranged in a predetermined pitch in the horizontal direction and arranged in a predetermined pitch in the vertical direction, and the Vt and Vs are vertical widths of the light transmitting portions and light shielding portions, respectively.

3. The stereoscopic image displaying apparatus according to claim 1, wherein said light providing means forms the plural light existing portions and the plural light non-existing portions by means of a light source device in which plural light emitting portions and plural light non-emitting portions are arranged in a predetermined pitch in the horizontal direction and arranged in a predetermined pitch in the vertical direction, and the Vt and Vs are vertical widths of the light emitting portions and light non-emitting portions, respectively.

4. The stereoscopic image displaying apparatus according to claim 1, wherein assuming horizontal widths of the light existing areas and light non-existing areas are Ht and Hs respectively, the vertical widths are set so as to satisfy the relation of Ht<Hs.

5. The stereoscopic image displaying apparatus according to claim 1, wherein the optical means comprising a fist lenticular lens where a plurality of cylindrical lenses having refractive power in the horizontal direction are arrayed horizontally in a predetermined pitch, and a second lenticular lens where a plurality of cylindrical lenses having refractive power in the vertical direction are arrayed vertically in a predetermined pitch.

6. The stereoscopic image displaying apparatus according to claim 1, wherein the image displayed by the display device consists of a horizontal-stripe combined image, in which two parallax images are respectively divided into multiple horizontal-stripe parallax images, and the divided horizontal-stripe parallax images are repeatedly arrayed in a predetermined pitch in the vertical direction in a predetermined order in correspondence with the N number of parallax images.

7. The stereoscopic image displaying apparatus according to claim 1, wherein said optical means converts each part of the patterned luminous flux into substantially parallel luminous flux in the horizontal cross section, and into luminous flux converging substantially on said display device in the vertical cross section.

8. A stereoscopic image display apparatus comprising;
    light providing means for providing patterned luminous flux including plural light existing areas and plural light non-existing areas each of which are arranged both in the horizontal and vertical directions;
    optical means having an array of optical elements each having a lens function at least in the vertical direction and having an array of optical elements each having a lens function at least in the horizontal direction;
    a display device for displaying two parallax images for respective one of right and left eyes of a viewer by being illuminated with the patterned luminous flux via said optical means, for leading the luminous flux from the parallax image for the right eye to the right eye and for leading the luminous flux from the parallax image for the left eye to the left eye, thereby enabling stereoscopic viewing of a image;
    wherein assuming horizontal widths of the light existing areas and light non-existing areas are Ht and Hs respectively, the horizontal widths are set so as to satisfy the relation of Ht<Hs.

9. The stereoscopic image displaying apparatus according to claim 8, wherein said light providing means forms the plural light existing areas and the plural light non-existing areas by means of a mask substrate provided with a mask pattern having plural light transmitting portions for transmitting illumination light and plural light shielding portions for blocking the illumination light each of which are arranged in a predetermined pitch in the horizontal direction and arranged in a predetermined pitch in the vertical direction, and the Ht and Hs are horizontal widths of the light transmitting portions and light shielding portions, respectively.

10. The stereoscopic image displaying apparatus according to claim 8, wherein said optical means includes a fist lenticular lens where a plurality of cylindrical lenses having refractive power in the horizontal direction are arrayed horizontally in a predetermined pitch, and a second lenticular lens where a plurality of cylindrical lenses having refractive power in the vertical direction are arrayed vertically in a predetermined pitch.

11. A stereoscopic image display apparatus comprising;

a light source;

a mask substrate provided with a mask pattern having plural light transmitting portions and plural light shielding portions each of which are arranged both in the horizontal and vertical directions for providing patterned luminous flux;

an optical device having an array of optical elements each having a lens function at least in the vertical direction;

a display device for displaying two parallax images for respective one of right and left eyes of a viewer by being illuminated with the patterned luminous flux via said optical device, for leading the luminous flux from the parallax image for the right eye to the right eye and for leading the luminous flux from the parallax image for the left eye to the left eye, thereby enabling stereoscopic viewing of a image;

wherein assuming vertical widths of the light transmitting portions and light shielding portions are Vt and Vs respectively, the vertical widths are set so as to satisfy the relation of Vt<Vs.

12. A stereoscopic image display apparatus comprising;

a light source device having plural light emitting portions and plural light non-emitting portions each of which are arranged both in the horizontal and vertical directions for providing patterned luminous flux;

an optical device having an array of optical elements each having a lens function at least in the vertical direction;

a display device for displaying two parallax images for respective one of right and left eyes of a viewer by being illuminated with the patterned luminous flux via said optical device, for leading the luminous flux from the parallax image for the right eye to the right eye and for leading the luminous flux from the parallax image for the left eye to the left eye, thereby enabling stereoscopic viewing of a image;

wherein assuming vertical widths of the light emitting portions and light non-emitting portions are Vt and Vs respectively, the vertical widths are set so as to satisfy the relation of Vt<Vs.

* * * * *